United States Patent [19]

Hariki et al.

[11] Patent Number: 5,133,047
[45] Date of Patent: Jul. 21, 1992

[54] ROBOT CONTROL METHOD AND APPARATUS

[75] Inventors: Kazuo Hariki; Kazuya Ishiguro; Tatsuya Koizumi, all of Toyama, Japan

[73] Assignee: Kabushiki Kaisha Fujikoshi trading as Nachi-Fujikoshi Corp., Toyama, Japan

[21] Appl. No.: 473,741

[22] Filed: Feb. 2, 1990

[30] Foreign Application Priority Data

Sep. 1, 1989 [JP] Japan .................. 1-227071

[51] Int. Cl.⁵ ............................................ G06F 15/46
[52] U.S. Cl. .................................... 395/97; 395/80; 901/2
[58] Field of Search ............... 364/513, 474–18, 364/185, 483, 478; 901/2; 318/568.21; 395/97, 80

[56] References Cited

U.S. PATENT DOCUMENTS

| | | | |
|---|---|---|---|
| 4,594,670 | 6/1986 | Itoh | 364/513 |
| 4,704,694 | 11/1987 | Czerniejewski | 364/513 |
| 4,821,207 | 4/1989 | Ming et al. | 364/513 |
| 4,835,710 | 5/1989 | Schnelle et al. | 364/513 |
| 4,841,430 | 6/1989 | Nakagawa et al. | 364/513 |

FOREIGN PATENT DOCUMENTS

| | | | |
|---|---|---|---|
| 55-99605 | 7/1980 | Japan | 364/513 |
| 63-278104 | 11/1988 | Japan | 364/513 |

*Primary Examiner*—Allen R. MacDonald
*Assistant Examiner*—George Davis
*Attorney, Agent, or Firm*—Spencer, Frank & Schneider

[57] ABSTRACT

A robot control method of the playback type and an apparatus for using the method in which position data and data regarding velocity are taught at a sequence of points for a work program, and a servo system is driven by the use of the taught data to playback or repeat the work program. Phase angles which increase as the robot progresses through the sequence of teaching points are taught as the data regarding the velocity of the work program. At playback, a reference phase angle computed on the basis of a previously-set playback cycle time for the work program. The reference phase angle increases at an advance velocity which decreases with an increase in the playback cycle time. During operation, the reference phase angle is compared with one of the taught phase angles, and the corresponding taught position data is outputted to the servo system when the reference phase angle exceeds the taught phase angle.

12 Claims, 3 Drawing Sheets

ROBOT CONTROL METHOD AND APPARATUS

BACKGROUND OF THE INVENTION

The present invention relates to robot control methods of the playback type and to apparatuses which employs the methods. More particularly, the invention relates to a robot control method and apparatus in which position data and data regarding velocity are taught at a plurality of points on an operation path of a work program, so that the taught data can be played back to drive a servo system and thereby repeat the work program.

In a conventional robot control method of the playback type, the taught data for the robot comprises position data for the teaching points and data regarding the velocity from a previous teaching point to the present teaching point. The taught data regarding the velocity is in the form of the absolute time for movement in physical space, such as a value determining the time for moving between two teaching points, for example, a mm/s or a seconds.

In the case where the data regarding the velocity is taught in terms of a value determining the time for moving between two teaching points, however, the following problems arise.

The data regarding the velocity determines only how much time is taken in moving between two points. If operation is connected at a standstill at a certain point, such as during performance of function processing without moving, inputting and outputting of signals with respect to peripheral devices, and so on, time is needed for interpretation of function information and input and output processing of signals. That time depends upon the processing speed of a control device. Further, in the servo system of the robot, there always exists a dynamic delay between a command position and the present position, so even the taught time for moving between the two points is not known if a playback is not executed. From these points of view, the cycle time of the work program is not accurately known if it is not actually measured at playback. In addition, if an attempt is made to determine the cycle time by actual measurement, the cycle time may vary depending upon the ambient temperature and fluctuations in the power source voltage. Accordingly, it is extremely difficult to control the cycle time.

Moreover, if a previously taught time for moving between the two points is altered, it is necessary to alter the velocity data per se. In the case where an attempt is made to shorten the cycle time of the work program, all the taught velocity data must be altered.

SUMMARY OF THE INVENTION

It is an object of the invention to provide a robot control method and an apparatus therefor capable of administering cycle time of a work program at playback.

It is another object of the invention to provide a robot control method and an apparatus therefor in which the cycle time can be freely altered without modification of the taught data at playback.

For the above purpose, according to the invention, there is provided a robot control method of the playback type in which position data and data regarding velocity are taught at a plurality for points of a work program, and a servo system is driven by the use of the taught data to playback the work program, wherein the method comprises the steps of teaching phase angles which increase in accordance with the progress of the teaching points, as the data regarding the velocity of the work program, computing, at playback, a reference phase angle on the basis of a previously-set playback cycle time for the work program, the reference phase angle increasing at an advance velocity which decreases with an increase in the playback cycle time, and comparing the reference phase angle with one of the taught phase angles to output the taught position data to the servo system when the reference phase angle exceeds the taught phase angle.

Preferably, the step of computing the reference phase angle includes the steps of computing a phase-angle increment which decreases with an increase in the playback cycle time set beforehand, and repeatedly adding the phase-angle increment at predetermined intervals of time to determine the reference phase angle.

Preferably, the step of computing the phase-angle increment includes the steps of setting the predetermined intervals of time by an oscillator, and dividing the total phase angle for one cycle of the work program by the playback cycle time and by the frequency of the oscillator to determine the phase-angle increment.

Further, for the above purpose, according to the invention, there is provided a robot control apparatus for playback type in which position data and data regarding velocity are taught at a plurality of points of a work program, and a servo system is driven by the use of the taught data to playback the work program, wherein the apparatus comprises taught-data memory means for storing therein taught phase angles which increase in accordance with the progress of the teaching points, as data regarding the velocity of the working program, and control means for computing, at playback, a reference phase angle on the basis of a playback cycle time set beforehand, the reference phase angle increasing at an advance velocity which decreases with an increase in the playback cycle time, and comparing the reference phase angle with one of the taught phase angles to output the taught position data to the serve system when the reference phase angle exceeds the taught phase angle.

Preferably, the control means comprises first register means for recording the playback cycle time, oscillation means for setting the predetermined intervals of time, second register means for determining the phase-angle increment from the total phase angle for one cycle of the work program, the playback cycle time and the frequency of the oscillation means and recording the phase-angle increment, summation means driven by the oscillation means correspondingly to the oscillation frequency of the oscillation means for outputting the phase-angle increment, third register means for repeatedly adding the phase-angle increment outputted from the summation means to determine the reference phase angle and recording the reference phase angle, and comparator means for comparing the reference phase angle with one of the taught phase angles to command outputting of the one of the taught position data when the reference phase angle exceeds the taught phase angle.

'In the invention constructed in the manner described above, taught phase angles successively which increase in accordance with the progress of the teaching points are employed as the data regarding the velocity, and the taught position data is outputted to the servo system at playback when the reference phase angle exceeds one of the taught phase angles. Accordingly, the position data is outputted in synchronism with the advance velocity of the reference phase angle, so that the robot is operated. The reference phase angle increases at the advance velocity, which decreases with an increase of the playback cycle time, and the robot operates at the playback cycle time so that it is possible to administer the cycle time of the work program. Further, if the playback cycle time is altered, the advance velocity of the reference phase angle changes. Accordingly, it is possible to freely alter the cycle time without modification of the taught data.

DETAILED DESCRIPTION OF THE PREFERRED EMBODIMENT

An embodiment of the invention will be described below with reference to FIGS. 1 through 3.

Figure 1:
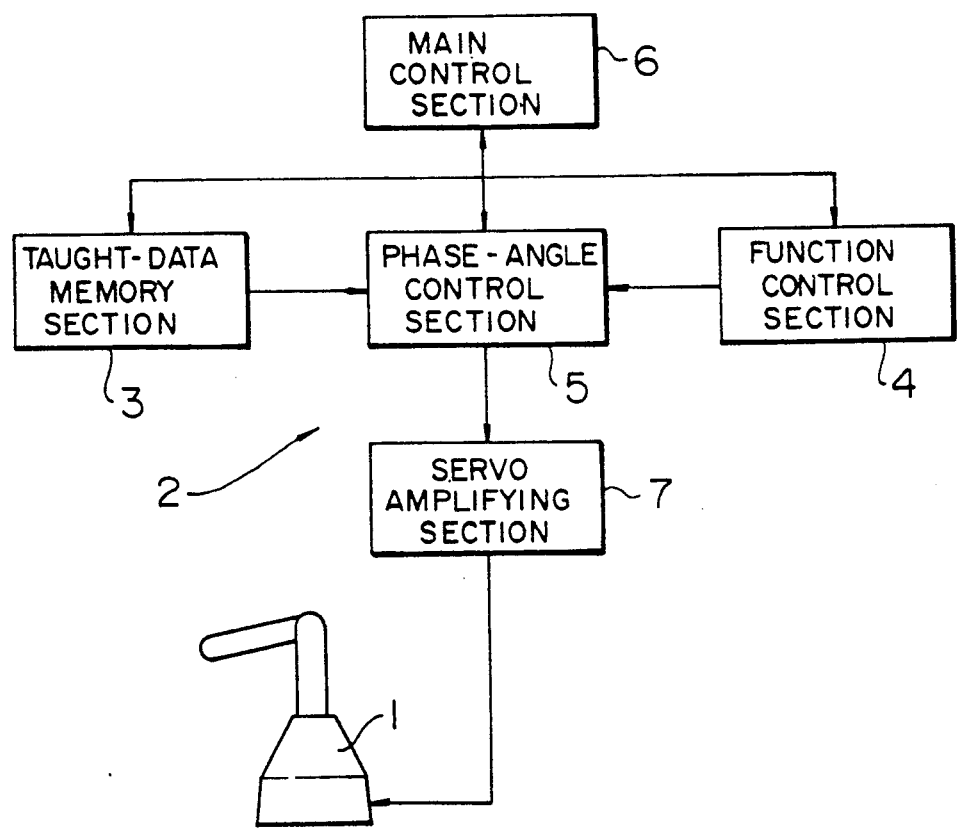
FIG. 1 is a schematic view showing the entire construction of a robot control apparatus according to an embodiment of the invention.

Referring to FIG. 1, there is shown a robot 1 whose operation is controlled by a control apparatus 2. The control apparatus 2 comprises a taught-data memory section 3 for recording taught data for a work program, and a function control section 4 for commanding function processings such as general-purpose signal outputting, interlock signal waiting and so on. Control apparatus 2 also includes a phase-angle control section 5 for processing and outputting the taught data in the taught-data memory section 3 in a predetermined manner, and a main control section 6 for organizing and controlling operational relationships between the taught-data memory section 3 and the function control section 4, and the phase-angle control section 5. Additionally included in control apparatus 2 is a servo amplifying section 7 for amplifying the taught data outputted from the phase-angle control section 5 to drive the robot 1.

The taught data recorded in the taught-data memory section 3 comprises position data and phase-angle data at each taught point. The phase-angle data is used in substitution for the conventional velocity data. The value of a taught phase angle $\theta_i$ increases with the progress of the taught points.

Figure 2:
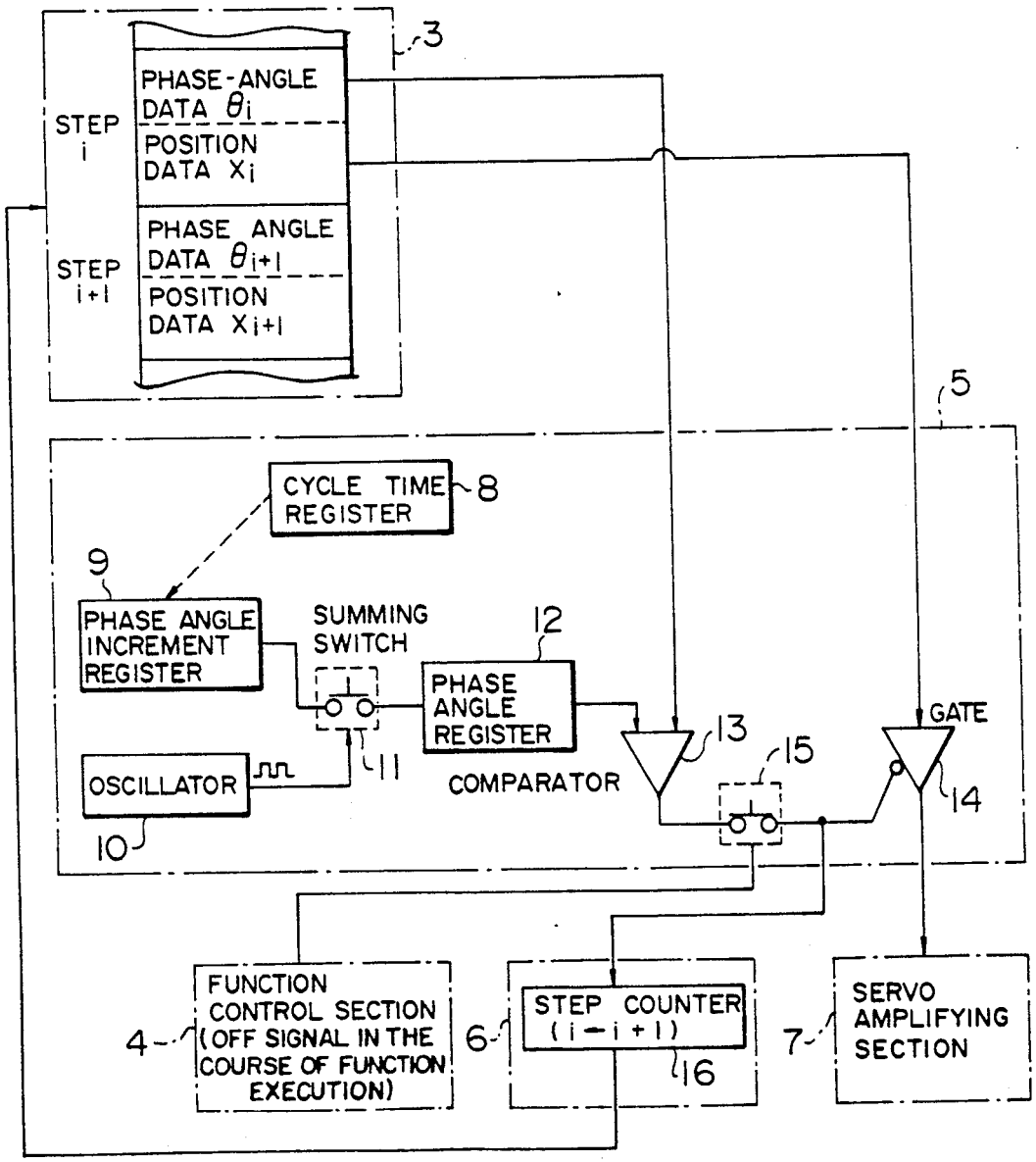
FIG. 2 is a view showing the detailed construction of the phase-angle control section illustrated in FIG. 1.

As shown in FIG. 2, the phase-angle control section 5 comprises a cycle-time register 8 for setting beforehand a playback cycle time $T_c$ for the work program, and a phase-angle increment register 9 for setting therein a phase-angle increment $\Delta C$, which decreases with an increase in the playback cycle time $T_c$. Phase-angle control section 5 also includes an oscillator 10, a summing switch 11 driven by the oscillator 10, and a phase-angle register 12 for recording a reference phase angle $\theta_r$ obtained by successive addition of the phase-angle increment $\Delta C$ at each driving of the summing switch 11. Phase-angle control section 5 additionally includes a comparator 13 for comparing a taught phase angle $\theta_i$ in a step i among the taught data recorded in the taught-data memory section 3 with the reference phase angle $\theta_r$ recorded in the phase-angle register 12 to output a signal when the reference phase-angle $\theta_r$ exceeds the taught phase angle $\theta_i$. A gate 14 and a position-data output switch 15 are also included in phase-angle control section 5. Gage 14 opens in response to the signal from the comparator 13 and outputs, to the servo amplifying section 7, taught-position data $x_i$ in the step i recorded in the taught-data memory section 3. The position-data output switch 15 is normally in an ON position and usually outputs the signal from the comparator 13 to the gate 14. However, when function processings (such as the previouslly-mentioned general-purpose signal outputting, interlock-signal awaiting, and so on) are started at the function control section 4, the position-data output switch 15 is switched to an OFF position where transmission of the signal from the comparator 13 to the gate 14 is cut off to stop outputting of the taught-position data.

Further, the gate 14 opens in response to the signal from the comparator 13 to output the position data $x_i$ in the step i and, simultaneously therewith, the signal from the comparator 13 is inputted into a step counter 16 in the main control section 6, to update the numerical value of the counter from i to i+1. The data memory section 3, thereupon selects the taught data in the step i+1.

In the embodiment shown, in which the oscillator 10 is utilized to drive the summing switch 11, the phase-angle increment $\Delta C$ set in the phase-angle increment register 9 is obtained by the equation set forth below. In this equation, $T_c$ (in seconds) is the playback cycle time set in the cycle-time register 8. CY (in degrees) is the phase angle of one cycle recorded in the taught-data memory section 3, (that is, the phase angle at the final taught point), and a (in Hz) is frequency of the oscillator 10:

$$\Delta C = \theta_{CY}/(T_c \cdot a)$$

Further, since the phase-angle increment $\Delta C$ is added at a period corresponding to the frequency of the oscillator 10, that is, a rate of once per 1/a seconds, the advance velocity of the reference phase angle $\theta_r$ is $\theta_{CY}/T_c$. Specifically, the reference phase angle $\theta_r$ increases at the advance velocity, which decreases with an increases in the playback cycle time $T_c$ of the work program, the playback cycle time $T_c$ being set beforehand.

Figure 3:
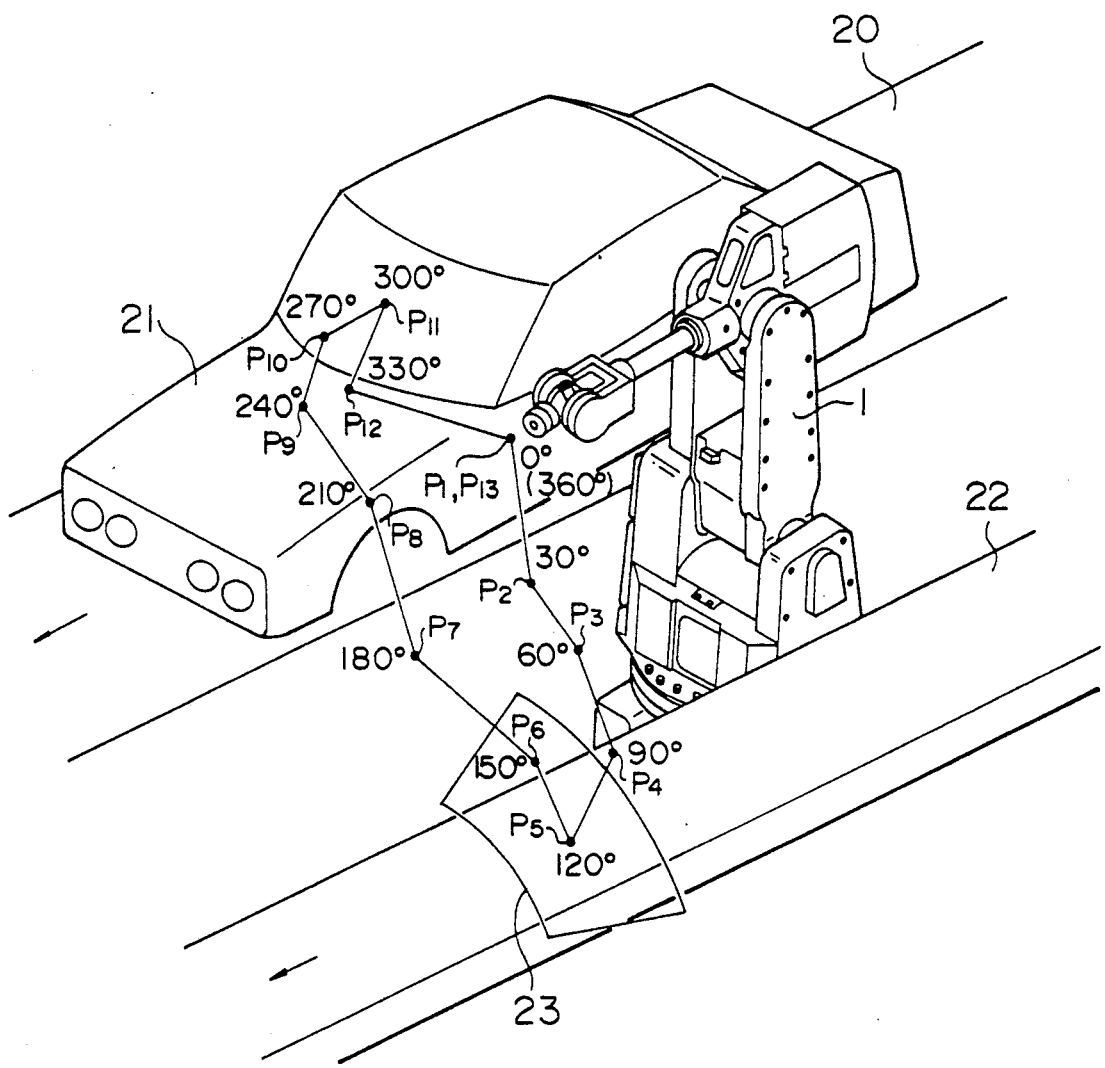
FIG. 3 is a view showing an example of a work program which is executed by the control apparatus according to the embodiment.

The operation of the embodiment will next be described with reference to an example of an actual work programs as illustrated in FIG. 3. In this example, an automotive body 21 is conveyed by a first conveyor 20, a windshield 23 is conveyed by a second conveyor 22, and the robot 1 mounts the windshield 23 on to the automotive body 21. The first and second conveyors 20 and 22 are asynchronous with each other and also slightly vary in the cycle time. When the automotive body 21 and window glass 23 arrive at the robot station, respective arrival signals are outputted to the control apparatus 2 for the robot 1.

First, the work program is taught. To this end, the position data and the phase angle are taught at each teaching point on an operation path of the work program. In this example, there are first through thirteenth teaching points $P_1$ through $P_{13}$. The taught phase angle at the first teaching point $P_1$, that is, at the original position, is 0°. The taught phase angle at the subsequent second teaching point $P_2$ is 30°. The taught phase angle also increases by 30° for each subsequent teaching point along the operation path. The arrival of the windshield 23 conveyed by the second conveyor 22 is awaited at the third teaching point P₃, which has its phase angle of 60°. When the windshield 23 arrives, the robot 1 receives it and, subsequently, awaits the arrival of the automotive body 21 at the eighth teaching point P₈, which has a phase angle of 210°. When the automotive body 21 arrives, the windshield 23 is mounted on the body 21, and the robot 1 is again returned to the thirteenth teaching point P₁₃, having a phase angle of 360°, that is, to the original position.

Subsequently, the desired playback cycle time $T_c$ is set in the cycle-time register 8 illustrated in FIG. 2. At this time, simultaneously with the setting of $T_c$, the phase-angle increment $\Delta C$ in accordance with the aforesaid equation $\Delta C = \theta_{CY}/(T_c \times a)$ is set in the phase-angle increment register 9.

The taught work program can then be played back. When the start of a playback work cycle is instructed or commanded by the main control section 6, the summing switch 11 is driven at the frequency of the oscillator 10. The phase-angle increment $\Delta C$ set in the register 9 is added repeatedly. The reference phase angle $\theta_r$ is recorded in the phase-angle register 12. The advance velocity of the reference phase angle $\theta_r$ at this time is $\theta_{CY}/T_c$ as mentioned previously. On the other hand, the numerical value of the step counter 16 is first returned to 1. The taught data in the step 1, that is, the taught data of the original position P₁, is selected at the taught-data memory section 3. The taught phase angle of the taught data is outputted to the comparator 13, and the position data is outputted to the gate 14.

At the comparator 13, the taught phase angle 0° of the step 1 is compared with the reference phase angle $\theta_r$ recorded in the phase-angle register 12, so that the gate 14 instantaneously opens to output the taught position data of the step 1 to the servo amplifying section 7. Simultaneously with this, the numerical value of the step counter 16 is updated to 2, so that the step in the taught-data memory section 3 is advanced to 2. Thus, the taught data at the second teaching point P₂ is outputted. That is, the taught phase angle of 30° is outputted to the comparator 13. The reference phase angle $\theta_r$ recorded in the register 12 increases at the aforementioned advance velocity $\theta_{CY}/T_c$. When the reference phase angle $\theta_r$ exceeds 30°, the gate 14 opens in response to the signal from the comparator 13. Thus, the position data at the second teaching point P₂ is outputted to the servo amplifying section 7. By doing so, the robot 1 moves to the taught position in synchronism with the advance velocity $\theta_{CY}/T_c$ of the reference phase angle $\theta_r$.

Subsequently, the numerical value of the step counter 16 is updated to 3. The step in the taught-data memory section 3 proceeds to 3, so that the taught data at the third teaching point P₃ is outputted. That is, the taught phase angle of 60° is outputted to the comparator 13. When the reference phase angle exceeds 60° in the same manner as described above, the taught-position data is outputted to the servo amplifying section 7, so that the robot 1 moves to the taught position. Simultaneously with this, the step in the taught-data memory section 3 advances by 1, so that the taught data at the fourth teaching point P₄ is outputted.

On the other hand, the robot 1 at this time is in the position of the third teaching point P₃, that is, in the position where the taught phase angle is 60°. Accordingly, if the windshield 23 conveyed by the second conveyor 22 has not arrived at the robot station, the arrival signal is not outputted. Thus, an OFF signal in the course of function execution is outputted from the function control section 4, so that the position-data output switch 15 is turned off. While the position-data output switch 15 is turned off, the signal from the comparator 13 is cut off, so that outputting of the position data is stopped. When the windshield 23 arrives at the robot station and the arrival signal is outputted, the OFF signal from the function control section 4 is nullified. Thus, the position-data output switch 15 is returned to the ON position. By doing so, the position data at the fourth teaching point P₄ is outputted to the servo amplifying section 7, so that the robot 1 is again operated.

In connection with the above, during the time the position-data output switch 15 is turned off, the reference phase angle $\theta_r$ recorded in the phase-angle register 12 continues to increase. If the reference phase angle $\theta_r$ at the time the position-data output switch 15 is returned to the ON position exceeds the 120° taught phase angle at the fifth teaching point P₅, the position data at the fourth and fifth teaching points P₄ and P₅ are outputted successively to the servo amplifying section 7 through the gate 14, simultaneously with the return of the position-data output switch 15 to the ON position. By doing so, even if the windshield 23 arrives late and the start of the operation of the robot is delayed, it is possible to recover from the delay.

Subsequently, the above-described operation is repeated on the sixth through thirteenth teaching points P₆ through P₁₃, so that the robot 1 is operated at a velocity in synchronism with the advance velocity of the reference phase angle $\theta_r$. At the position of the eighth teaching point P₈ (having a phase angle of 210°), if the automotive body 21 conveyed by the first conveyor 20 has not yet arrived at the robot station, an OFF signal is outputted from the function control section 4 in a manners similar to that previously discussed with respect to the third teaching point P₃ with the phase angle 60°. Thus, the position-data output switch 15 is turned off, and the signal from the comparator 13 is cut off while the position-data output switch 15 is turned off, so that outputting of the position data is stopped. After the automotive body 21 has arrived, the position signal is outputted.

The embodiment is constructed as described above. Accordingly, the robot 1 moves in synchronism with the advance velocity $\theta_{CY}/T_c$ of the reference phase angle $\theta_r$. Further, the position data is outputted in synchronism with the advance velocity of the reference phase angle $\theta_r$, even if the operation of the robot is delayed. Thus, it is possible to recover from the delay. Consequently, it is possible to operate the robot 1 at the playback cycle time $T_c$ set beforehand, and it is possible to administer the work cycle time. Moreover, if the value of the playback cycle time is altered, the phase-angle increment $\Delta C$ changes, so that the advance velocity $\theta_{CY}/T_c$ of the reference phase angle $\theta_r$ changes. Accordingly, it is possible to freely alter the cycle time of the robot operation, depending upon date or time, or types or kinds of work, without modification of the taught data. Furthermore, the alteration of the cycle time is possible even in the course of playback.

In connection with the above, in the embodiment, in order to calculate or compute the reference phase angle $\theta_r$ (which increases at the advance velocity, the advance velocity itself decreasing with an increase in the playback cycle time $T_c$, which is set beforehand), the phase-angle increment $\Delta C$ (which decreases with an increase in the playback cycle time $T_c$) is obtained from the playback cycle time $T_c$, the phase angle $\theta_{CY}$ of one entire work cycle and the oscillation frequency a, and the phase-angle increment $\Delta C$ is added at the frequency of the oscillator 10. However, similar results can be obtained if a constant value is set as the phase-angle increment, and if the oscillation frequency of the oscillator 10 driving the summation switch 11 is controlled such that the oscillation frequency decreases with an increase in the playback cycle time $T_c$.

According to the invention, the playback operation of the robot is done in synchronism with the advance velocity of the reference phase angle, and the position data is outputted in synchronism with the advance velocity of the reference phase angle even if the operation of the robot is delayed. Accordingly, it is possible to recover from a delay, and it is possible to operate the robot at a playback cycle time set beforehand. In addition, if setting of the playback cycle time is altered, the advance velocity of the reference phase angle changes. Thus, it is possible to freely alter the cycle time of the robot operation without modification of the taught data.

What is claimed is:

1. A robot control method of the playback type, in which position data regarding velocity are taught at a sequence of teaching points for a work program, and the taught data are used to drive a servo system to playback the work program, wherein the robot control method comprises the steps of:

using taught phase angles which increase in accordance with said sequence of teaching points as the taught data regarding the velocity of the work program;

computing, at playback, a reference phase angle which is based on a playback cycle time for the work program set beforehand, said reference phase angle increasing at an advance velocity which decreases with an increase in the playback cycle time;

comparing the reference phase angle with one of said taught phase angles;

outputting a taught position data to the servo system when the reference phase angle is larger than said one of said taught phase angles; and driving the servo system in accordance with the outputted taught position data.

2. A robot control method according to claim 1, wherein the step of computing the reference phase angle includes the steps of computing a phase-angle increment which decreases with an increase in the playback cycle time, and repeatedly adding the phase-angle increment at predetermined intervals of time to determine said reference phase angle.

3. A robot control according to claim 2, wherein the step of computing the phase-angle increment includes the steps of setting said predetermined intervals of time by an oscillator, and dividing the taught phase angle for one complete cycle of said work program by said playback cycle time and the oscillation frequency of said oscillator to determine said phase-angle increment.

4. A robot control apparatus of the platback type, in which position data and data regarding velocity are taught at a sequence of teaching points for a work program, and a servo system is driven by using the taught data to playback the work program, wherein the apparatus comprises:

taught-data memory means for storing therein taught phase angles as the taught data regarding the velocity of the work program, the taught phase angles increasing in accordance with the sequence of teaching points; and control means for computing, at playback, a reference phase angle which is based on a playback cycle time set beforehead, said reference phase angle increasing at an advance velocity which decreases with an increase in the playback cycle time, and for comparing the reference phase angle with one of said taught phase angles to output a taught position data to the servo system when the reference phase angle is greater than said one of said taught phase angles, whereby the servo system is driven depending on the outputted taught position data.

5. A robot control apparatus according to claim 4, wherein said control means computes a phase-angle increment which decreases with an increase in said playback cycle time, and repeatedly adds the phase-angle increment at predetermined intervals of time to determined said reference phase angle.

6. A robot control apparatus according to claim 5, wherein said control means includes oscillation means for setting said predetermined intervals of time, the taught phase angle for one complete cycle of said work program being divided by said playback cycle time and the oscillation frequency of said oscillation means to determine said phase-angle increment.

7. A robot control apparatus according to claim 5, wherein said control means comprises first register means for recording said playback cycle time; oscillation means for setting said predetermined intervals of time; second register means for determining said phase-angle increment from the taught phase angle for one complete cycle of said work program, said playback cycle time, and the oscillation frequency of said oscillation means, and for recording said phase-angle increment; summation means driven at the oscillation frequency of said oscillation means for outputting said phase-angle increment; third register means for repeatedly adding said phase-angle increment outputted from said summation means to determine said reference phase angle, and for recording the reference phase angle; comparator means for comparing said reference phase angle with one said taught phase angles; and gate means for outputting a taught position data when the reference phase angle is larger than the taught phase angle.

8. A method for controlling a robot to move along a predetermined path which passes through a sequence of teaching points, comprising the steps of:

(a) storing position data for each of the teaching points;

(b) storing phase angle data for each of the teaching points, the phase angle data stored for a given teaching point being an increasing function of the position of the given teaching point in the sequence;

(c) setting an initial value in a step counter, the value in the step counter designating one of the stored position data and one of the stored phase angle data;

(d) storing a phase angle increment;

(e) repeatedly adding the phase angle increment to find a reference phase angle;

(f) comparing the reference phase angle to the phase angle data designated by the value in the step counter;

(g) transferring the position data designated by the value in the step counter to a servo amplifier, and driving the servo amplifier so as to move the robot to a teaching point which corresponds to the transferred position data, when the reference phase angle is greater than the phase angle data designated by the value in the step counter;

(h) incrementing the step counter when the reference phase angle is greater than the phase angle data designated by the value in the step counter; and (i) repeating steps (f) through (h) at least once.

9. The method of claim 8, wherein step (e) is conducted by repeatedly adding the phase angle increment at a rate determined by an oscillator having a constant frequency, and further comprising the step of calculating the phase angle increment before step (d) is conducted, the phase angle increment being a function of a plurality of parameters which include the frequency of the oscillator and a preselected playback cycle time for moving the robot along the path.

10. The method of claim 8, wherein step (e) is conducted by repeatedly adding the phase angle increment at a variable rate determined by an oscillator having a frequency which is a function of a preselected playback cycle time for moving the robot along the path, and wherein step (d) is conducted by storing a constant phase angle increment that is independent of the playback cycle time.

11. The method of claim 8, wherein the robot is employed at a robot station to manipulate an object that moves toward the robot station as the robot moves along the path, and further comprising the step of temporarily suppressing steps (g) and (h) if the object has failed to arrive at the robot station when the robot reaches a predetermined teaching point.

12. The method of claim 11, wherein step (f) is conducted by a comparator having an output port, and wherein the step of temporarily suppressing is conducted by opening a normally closed switching means connected to the output port.

* * * * *